Figure 4:
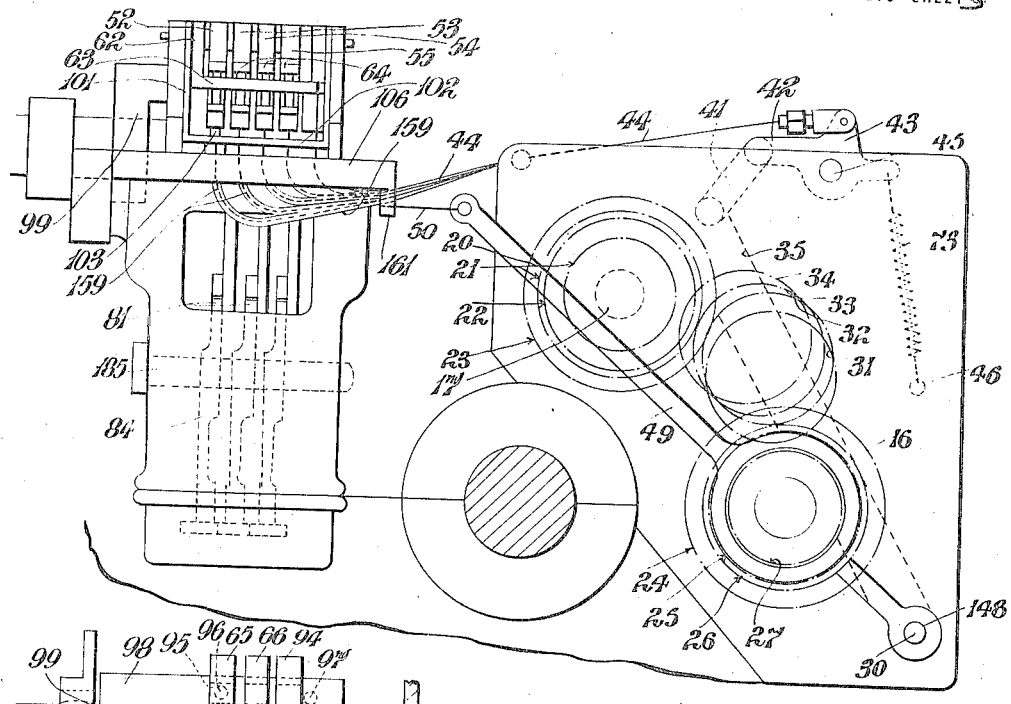

Feb. 20, 1923.
A. R. MITCHELL.
CHANGE SPEED GEAR FOR MOTOR VEHICLES.
FILED APR. 3, 1922.
1,445,703.
3 SHEETS—SHEET 1.
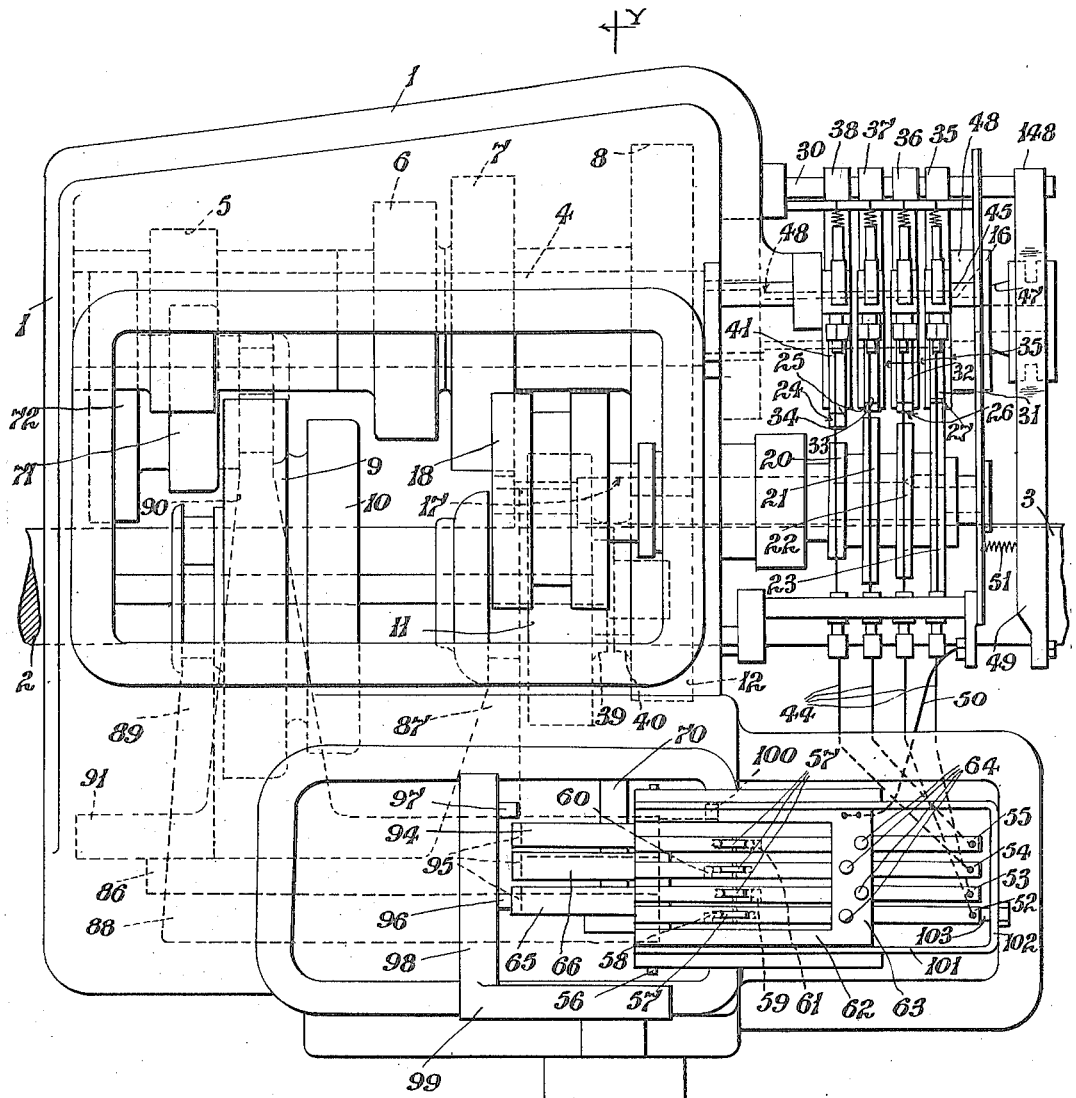
Fig.1.
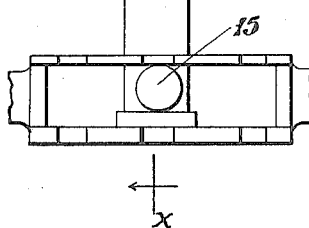
Inventor.
Archibald Robertson Mitchell,
By B. Singer.
Atty.

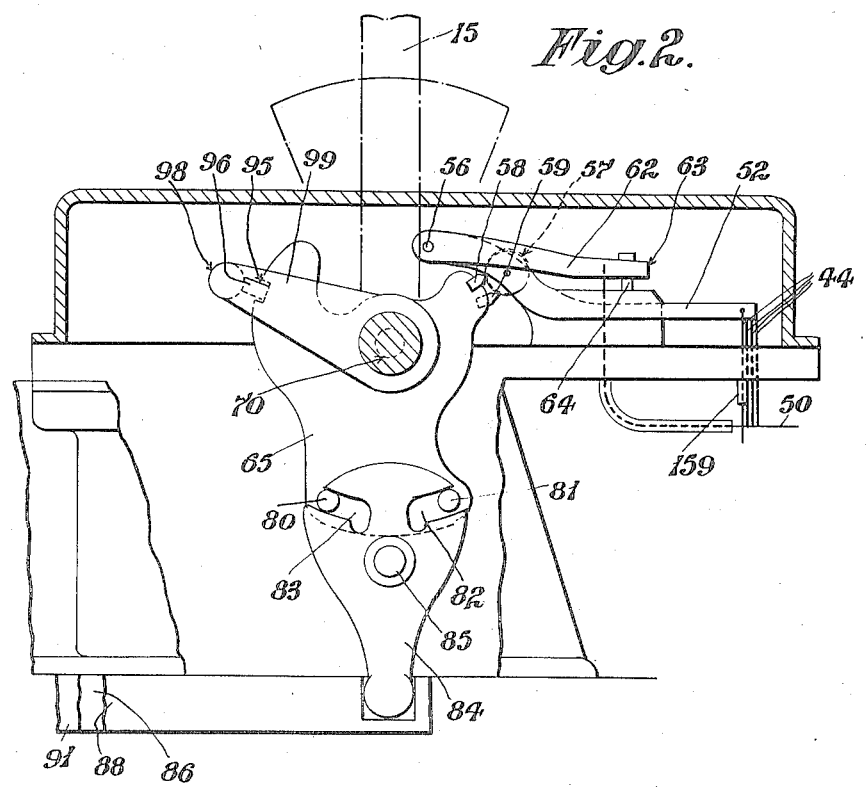
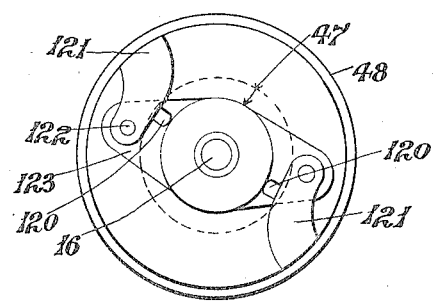

Patented Feb. 20, 1923.

1,445,703

UNITED STATES PATENT OFFICE.

ARCHIBALD ROBERTSON MITCHELL, OF LONDON, ENGLAND.

CHANGE-SPEED GEAR FOR MOTOR VEHICLES.

Application filed April 3, 1922. Serial No. 549,340.

*To all whom it may concern:*

Be it known that I, ARCHIBALD ROBERTSON MITCHELL, a subject of the King of Great Britain, and resident of London, England, have invented certain new and useful Improvements in or Relating to Change-Speed Gears for Motor Vehicles, of which the following is a specification.

This invention relates to change speed gear and more particularly change speed gear of the axially slidable spur wheel type, and has for its object to provide means whereby the noisy and destructible jumping of the teeth of such wheels into mesh during the speed changing operation is avoided or reduced to a minimum.

Heretofore it has been proposed in toothed wheel change speed gear of the lay shaft kind having longitudinally sliding gear wheels, to provide means whereby the peripheral speeds of any selected pair of the wheels can be brought up to an equal value before being brought into engagement, and it has also been proposed to effect this by arranging the auxiliary gear as additional spur or friction gearing on the change speed gear shafts, such gearing being brought into operation by the same hand lever as the main change speed gear. It has also been proposed in such auxiliary gear to bring the pairs of the gears into operation by means of idle friction and gear wheels mounted on pivoted levers and adapted to be brought into operation by the hand lever of the main change speed gear.

The present invention comprises change speed gear having auxiliary change speed gear for bringing the peripheral speeds of the pairs of wheels of the main change speed gear to an equal value before engagement both gears being adapted to be brought into operation by a common hand lever, wherein the mechanism operated by the hand lever to effect change of speed in the main gear is retained stationary in position and/or rendered inoperative during a preliminary movement of the hand lever, and such preliminary movement of the hand lever is used to bring into operation the auxiliary gear corresponding to that of the selected speed. The invention is applicable to variable speed gear of the multi-gear wheel kind wherein two shafts are provided with pairs of gear wheels and different speeds are produced by engaging and disengaging the pairs of gear wheels by an axially sliding movement of one of a pair by a lever operated by hand. More particularly this invention relates to motor car gear boxes of the standard type giving several speeds forward, a direct drive, a neutral position and a reverse drive.

In this type of variable speed gear box owing to the peripheral speed of one of any pair of gear wheels which it is desired to engage with the other of the pair and from which it may differ considerably in peripheral speed difficulty is often met with in producing the desired engagement of any desired pair of gear wheels while in motion. According to the present invention mechanism or gearing is provided whereby the peripheral speeds of any pair of such gear wheels it is desired to bring into operation can be made equal.

The invention is also applicable to multi-speed chain gear boxes where the engagement and disengagement of each pair of sprockets and chain from and to a driving shaft is produced by the sliding of one portion of a dog clutch or the like in and out of engagement with the other portion thereof wherein the same difficulty caused by variation of peripheral speed of the teeth of the dog clutch portions is encountered.

In applying the invention to change speed toothed gearing of the kind having two parallel shafts on which are mounted co-operating pairs of gears of the relative sizes to give the different speeds, the members of the said pairs being relatively slidable axially to bring any selected pair into gear, means are provided for driving the two shafts at the relative different speeds corresponding to the required change of speed, before the pairs of wheels adapted to give such change of speed are moved axially into gear.

Figure 5:
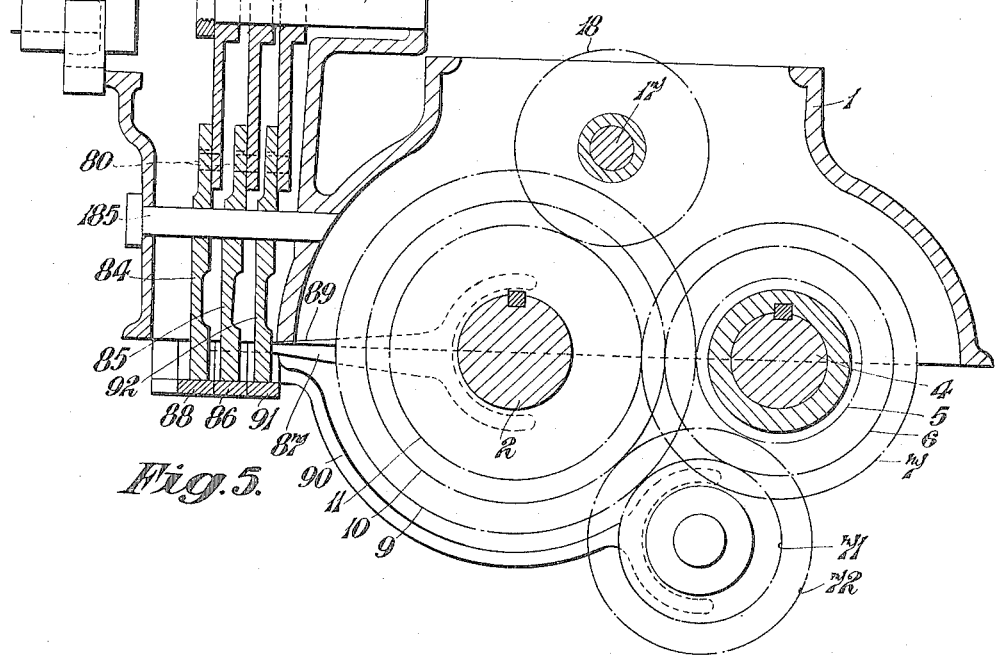

An embodiment of the invention is illustrated by the accompanying drawings wherein, Figure 1 is a plan of a well known type of motor car gear box fitted with the auxiliary gear necessary for it to operate in accordance with the present invention, Figure 2 is a partial end elevation of Figure 1, Figure 3 a detail of a clutch, Figure 4 a partial end elevation of Figure 1, and Figure 5 a sectional elevation through x—y on Figure 1.

In these drawings 1 is the gear box, 2 the driven or tail shaft driving the road wheels and 3 the engine or power shaft.

The lay shaft 4 is of the usual type having gear wheels 5, 6, 7 and 8 and reverse wheels 71 and 72 adapted to gear with the corresponding gear wheels 9, 10 and 11 on the driven shaft 2, and which can be moved axially to bring the selected pair into gear by means of the gear changing hand lever 15 operated in the usual manner, the direct drive being effected through the clutch members 39 and 40, the latter being secured together with the wheel 12 on the shaft 3.

In the example shown in the drawings 16 is an extension of the lay or counter shaft 4, and 17 an auxiliary shaft mounted in a bearing in the walls of the gear box 1. The portion of the shaft 17 within the gear box has secured thereon a gear wheel 18 arranged to mesh continually with the gear wheel 11 on the driven shaft 2. The portion of the shaft 17 on the outside of the gear box has mounted thereon a set of toothed gear wheels 20, 21, 22 and 23 and mounted on a sleeve on the shaft 16 is a corresponding set of toothed gear wheels 24, 25, 26 and 27 arranged in co-planar pairs of ratio to give the change in speed corresponding to that of the ordinary gears in the gear box. The gear wheels 20 to 23 may be connected to the shaft 17 by a yieldable device to facilitate the meshing of the idlers with them.

Between each of the pairs of auxiliary wheels and in the same plane thereof is rotatively mounted on a lever 35 an intermediate or idler toothed wheel 31 and corresponding idler wheels 32, 33, 34 for the other pairs of auxiliary gears are mounted on corresponding levers 36, 37 and 38 and each of these levers is pivotally mounted on a shaft 30 extending from the wall of the gear box. At the upper end of each of the levers 36, 37 and 38 is arranged a pair of toggle links 41 and 42, the link 42 being formed as an arm of a bell-crank lever 43 to which is connected an operating wire cable 44. This wire 44 when pulled operates on the bell-crank lever 43 to turn it about its pivot 45 in such a manner as to straighten the toggle links 41 and 42 and thereby move the lever 35 sufficiently to place the idler gear 31 in mesh with both the gears 23 and 27 arranged in the same plane. The gear wheel 31 is drawn out of mesh with the gear wheels 23 and 27 when the pull on the wire 44 is released, by means of a spring 73 anchored at 46 to a rod extending from the gear box. Each of the other pairs of gear wheels 20 and 24, 21 and 25, 22 and 26, is operated in the same manner by their corresponding idler wheels 34, 33 and 32 and levers 38, 37 and 36.

The gear wheels 24, 25, 26 and 27 are mounted on a common sleeve 48 on the shaft 16, which is provided with a clutch 47 whereby it can be connected to the sleeve 48. This clutch is operated by a spring controlled lever 49 pivoted at 148 and connected at its free end to a flexible wire or cable 50 whereby it can be operated to put the clutch into operation, the clutch being released by the spring 51 when the pull on the cable 50 is released.

The mechanism for operating the cables consists of a series of levers 52, 53, 54 and 55 pivoted at 56, each being provided with a roller 57 adapted to be raised by a cam 58, separate cams 59, 60 and 61 being provided for the rollers of the corresponding levers 52, 53, 54 and 55.

The free ends of the levers 52, 53, 54 and 55 are connected to cables 44, the cables being for a portion of their length arranged within flexible non-compressible tubes 159 of which one end is fixed to the plate 106 while the other end is fixed to the bracket 161.

Through one of these flexible non-compressible tubes passes the cable 50 of the clutch 47 and is connected to the free end of a lever frame 62 pivoted at 56 and provided with a cross bar 63 through which pass downwards a series of adjusting screws 64 one of which is provided immediately over each of the levers 52, 53, 54 and 55 so that each of these levers while pulling or immediately afterwards, its particular cable 44 also pulls the cable 50 of the clutch 47.

The cams 58, 59, 60 and 61 are arranged on rocking plates or selector discs 65 and 66, which are pivoted on the shaft 70, the rocking plate 65 carries the cams 58 and 59 in different planes the first in the plane of the lever 52 and the second in the plane of the lever 53, while the rocking plate 66 carries the cams 60 and 61 arranged in a similar manner with respect to the levers 54 and 55.

The rocking plate 65 is provided with pins or projections 80 and 81 which operate in slots 82 and 83 arranged in the opposite edges of a rocking lever or plate 84 pivoted at 185 and adapted at its lower end to move the horizontally slidable rod 86 which operates the arm 87 to slide the gear wheels 11 into engagement with the gear wheel 7 on the lay shaft 4 and when moved in the opposite direction to move the clutch member 39 into engagement with the clutch member 40 on the power shaft 3. The slots 82 and 83 in the rocking plates or levers are curved so as to be concentric with the pivot 70 of the hand lever 15, and thereby prevent movement of the rocking lever 84 about its pivot 85 until the pins engage the inner ends of the slots. The rocking plate 66 is provided with a pair of pins arranged thereon as the pins 80 and 81 on the rocking plate 65 and adapted to operate the slidable rod 88 which operates the arm 89 to slide the gear wheel 9 into mesh with the gear wheel 5 on the lay shaft 4 when moved in one direction and when moved in the opposite direction to slide the gear wheel 10 into mesh with the gear wheel 6 on the lay shaft 4.

The slots 82 and 83 in rocking lever 84 are of such a curvature that when the gear operating hand lever 15 is vertical or in alignment with the rocking lever 84 the centre of the curvature of the slots in the centre of the shaft 70 of the rocking plate 65 and the hand lever 15, so that during the initial movement of the hand lever in either direction no movement is transmitted to the change speed gear sliding rods 86 and 88 and during this initial movement the cams 58, 59, 60 and 61 are designed to operate their respective levers of the idler wheel operating gear. When, however, the hand lever 15 is tilted sufficiently to engage the end of the slots 82 and 83 the ordinary movement to change the speed gearing is effected, the lost motion being compensated by arranging the pivot pin 85 of the rocking lever 84 sufficiently near the path of the pins 80 and 81 to give the rod engaging end of the rocking lever 84 the range of motion necessary to effect the desired change of gear.

The reversing gear of the speed motion is of the kind consisting of two gear wheels 71 and 72 mounted on a sleeve rotating on a spindle of which the end is secured in the wall of the gear box. The sliding movement of this sleeve is effected by means of an arm 90 secured to a sliding rod 91 which is operated by the lower end of a rocking lever 92 similar to the rocking levers 84 and 85 and having slots similar to 82 and 83 in which operate pins similar to 80 and 81. These pins are provided on a third rocking plate 94.

The rocking plates 65, 66 and 94 are adapted to be rocked by means of pins 96 and 97 adapted to slide laterally into and out of grooves 95 provided in the rocking plates. The pins 96 and 97 extend from a frame 98 having an arm portion 99 secured to the hand lever 15.

The operating of the device is as follows:—Starting with the hand lever 15 in the vertical or neutral position, in order to place the first speed gearing in operation the hand lever 15 is moved laterally to bring the frame 98 into such position as to bring the pin 96 into the groove 95 of the rocking plate 65, the hand lever 15 is then pulled to the left and this causes the cam 59 to lift the lever 53 which pulls the wire cable 44 attached thereto and so exerts a pull on the lever 43 which straightens the toggle links 41 and 42 and thereby moves the lever 35 to force the idler gear wheel 31 into gear with both of the gear wheels 23 and 27. This movement places the gear wheels in mesh necessary to drive the lay shaft at the speed corresponding to that at which it may be driven from the road wheels by the momentum or inertia of the car through the shaft 2 while the engine is de-clutched from the driving gearing. The speed of the lay shaft sleeve 48 due to the bringing into gear of the idler wheel 31 will correspond to the first speed of the change speed gear and the lay shaft 4 is driven at such speed by means of the clutch 47 which is brought into operation by the lever 53 which in rising lifts the pivoted frame 62 which pulls the operating wire cable 50 of the clutch 47. The clutch 47 shown in Figure 3 consists of a drum forming an extension of the sleeve 48. The inner side of the rim of this drum is engaged by two brake blocks 121 pivoted at 122 to a flange 123 secured to the shaft 16. The inner sides of these blocks 121 are provided with pins 120 bearing on the conical clutch member 47, so that an axial movement of this member will, by engaging the pins 120 force the block 121 into engagement with the rim of the sleeve 48. The auxiliary gear wheel 23 is driven by the shaft 2 through the gear wheel 11 and the auxiliary gear wheel 18 which is always in mesh therewith, and a further movement of the hand lever 15—as described above—moves the rocking lever 84 by means of the rocker plates 65, slide 88 and the arm 89 to bring the wheel 9 into gear with the wheel 5 of the lay shaft 4 and thereby effect the bringing into operation of the first speed of the gear box. During this operation the clutch 47 is brought into operation by the rising of the lever 62 by the lever 53 as described above and immediately afterwards the cam 59 passes to the other side of the roller 57 of the lever 53 and thereby releases the toggle mechanism 43, 42 and 41 and clutch 47 so that the operating members thereof are returned to their original position by means of the springs 73 and 51.

In a similar manner by moving the hand lever 15 to the right the cam 58 of the rocking plate 65 raises the lever 52 and thereby the mechanism associated therewith to bring the idler wheel 32 into mesh with the gear wheels 22 and 26 and so effect the driving of the lay shaft extension 48 and by the clutch 47 the lay shaft 4 at a speed corresponding to the second speed of the gear box, a further movement of the hand lever 15 operates to slide the gear wheels 10 and 6 of the second speed into mesh.

The third speed is effected by sliding the hand lever 15 from its central position to bring the pin 96 into the groove 95 of the rocker plate 66, when the movement of the hand lever to the left will bring into operation the gear corresponding to the third speed, and the fourth speed is brought into operation by moving the hand lever to the right, the cams 61 and 60 operating in a similar manner to the cams 59 and 58 on their corresponding cable pulling levers 55 and 54.

The bringing of the reversing gear into operation is effected in a similar manner by sliding the hand lever 15 laterally to bring the pin 97 into a groove similar to 95 in the rocker plate 94. This rocker plate is provided with a cam 100 which lifts a lever frame 101 pivoted at 56 and provided on the cross member 102 with a pin adapted to engage and lift a lever 52 which brings into operation the second speed auxiliary gear.

The auxiliary gearing is shown as toothed gear, it will however, be understood that friction gearing may be substituted therefor, and in such case the clutch 47 may be dispensed with.

What I claim and desire to secure by Letters Patent is:—

1. Change speed gearing comprising a main gear, an auxiliary change speed gear for bringing the peripheral speeds of the pairs of wheels of the main change speed gear to an equal value before engagement, a common operating lever for controlling both the main and auxiliary gears and means associated with the operating lever for insuring upon initial movement of said lever operation of the auxiliary gear and prevention of movement towards engagement of the main gears, continued movement of said lever permitting and producing engagement of said main gear.

2. A transmission speed controlling mechanism comprising a main gear set and an auxiliary gear set adapted to bring selected gears on the counter-shaft of the main gear set to a peripheral speed substantially that of the corresponding gear on the main driven shaft, of a gear shifting lever common to the main and auxiliary gears, means to selectively operate said auxiliary gear set therefrom, these means being so associated with said lever that a substantially short movement of the lever selectively operates said auxiliary gear set and prevents operation of the main gear set, while a further movement selectively sets and permits operation of said main gear set.

3. A transmission speed controlling mechanism comprising in combination with the main driving gears, and the main countershaft gears, of an auxiliary gear set to bring the peripheral speed of any selected gears on the said main countershaft to substantially peripheral speed of the corresponding gear on the said main driven shaft, said auxiliary gear set comprising gears driven by said main driven shaft and gears adapted to be connected to said main countershaft, and selectively operated connections between said gears.

4. In a change speed gearing, the combination of a gear casing, a main gear set comprising a main driving shaft, a main driven shaft and a countershaft and gears slidable on said driven shaft, an auxiliary gear set comprising a shaft fixed to one end of said countershaft, a sleeve carried by said shaft, clutch means to give a driving connection between said shaft and sleeve, a second shaft substantially parallel to said first shaft and driven by the main driven shaft, gears on said sleeve and on said second auxiliary shaft, said gears being the equivalent of the gears of the main gear set, levers pivoted to said gear casing, gears mounted on said levers between said auxiliary gear shafts, and operating means whereby a desired lever is caused to move to place the gear carried thereby to connect the said auxiliary shafts and to move said clutch to give a driving connection between the first auxiliary shaft and the sleeve carried thereby before the gears of the main driven shaft are moved to mesh with the countershaft.

5. A transmission speed controlling mechanism comprising in combination with the main driving gears, main driven gears and the main countershaft gears and auxiliary gears driven by said main countershaft gears, and means to unclutch the connection between the same, and auxiliary gears driven by said main driven shaft and gears to connect a desired pair of gears of said auxiliary gear set, of means to shift said gears comprising a lever, means to selectively shift the connecting gears of said auxiliary set and clutch them to rotate said main countershaft by a preliminary movement of said lever, and means to selectively shift the gears of said main gear set by a further movement of said lever.

6. A transmission speed controlling mechanism comprising in combination with the main driving gears, the main driven gears and the main countershaft gears thereof, of a shaft driven by said main countershaft, a shaft driven by said main driven shaft and gears carried by said two last named shafts, said gears being the equivalents of the main gears, means whereby the set of gears carried by one of said last named shafts may be unclutched therefrom, gears movable between said two last named shafts to connect a desired pair of gears, means to move said gears to the desired operative relation, and main operating means to operate said clutching means and shift the last named gears prior to placing the main gears in the desired operative relation.

7. A transmission speed controlling mechanism comprising in combination with the main gear set and an auxiliary gear set comprising two auxiliary gear shafts one of which is driven by the main driven shaft and the second of which is adapted to be clutched to the main countershaft and means to selectively connect to drive said second named auxiliary shaft from the first named auxiliary shaft, of means to selectively operate said gears comprising a lever pivoted intermediate its ends, a rocker plate adapted to be operated by said lever, a cam carried by said rocker plate, means to shift said auxiliary gears and operate said clutch connection between the main countershaft and said second auxiliary gear shaft, said means being operated by said cam by a relatively small movement of said lever, and rocker plate, a pin carried by said rocker plate, a rocking lever having slots therein in which the pins upon said rocker plate are adapted to move, the length of the slots being such that the rocking lever will not be moved until the lever and rocker plate are moved a substantial distance, and means to shift said main gears connected to said rocking lever.

8. In a transmission speed controlling mechanism, the combination with a main gear set and an auxiliary gear set adapted to bring the peripheral speed of any selected gear on the main countershaft to substantially that of the corresponding gear on the main driven shaft, of a shaft, a lever slidable on and pivoted on said shaft, an arm carried by said lever, a lug on said arm, rocker plates carried by said shaft in spaced relation thereon and having keyways adapted to receive the lug on said lever that they may be selectively operated thereby, cams on said rocker plates, levers pivoted adjacent said rocker plates and adapted to be raised by said cams by a relatively small movement of said first named lever through said rocker plates, a frame pivoted over said levers and adapted to be raised by the continued upward movement thereof, means extending from said levers to selectively operate said auxiliary gears, and means extending from said frame to close a driving connection between the auxiliary gears and the main gears, rocking levers pivoted below said rocker plates, slots in said rocking levers, pins on said rocker plates to move in said slots to move said rocking levers by a substantial movement of said first named lever through said rocker plates, and means connected to said rocking levers to selectively operate said main gears.

9. A transmission speed controlling mechanism comprising in combination with a main gear set, an auxiliary gear set comprising a shaft driven by the main countershaft, a second shaft driven by the main driven shaft, a sleeve carried by said first shaft and adapted to rotate thereon, a dog clutch to connect said first shaft and said sleeve, and means to drive said sleeve from said second shaft at selective speeds to cause the main countershaft to rotate at a speed corresponding to that of the main driven shaft for the selected speed.

10. A transmission speed controlling mechanism comprising in combination with a main gear set, an auxiliary gear set consisting of two shafts and gears thereon adapted to be selectively connected to cause the main countershaft to rotate at a speed corresponding to that of the driven shaft for the selected speed, of means to selectively shift said auxiliary gear set comprising a lever, a set of levers selectively operable by said first lever, gears carried by each one of said set of levers and adapted to mesh with the gears on said auxiliary shafts, and means to move said lever carried gears out of engagement with said shaft carried gears.

In witness whereof I affix my signature.

ARCHIBALD ROBERTSON MITCHELL.